United States Patent
Patel

(10) Patent No.: US 6,661,209 B2
(45) Date of Patent: Dec. 9, 2003

(54) LEADING EDGE MODULATOR FOR POST REGULATION OF MULTIPLE OUTPUT VOLTAGE POWER SUPPLIES

(75) Inventor: Amrit P. Patel, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 184 days.

(21) Appl. No.: 10/011,819

(22) Filed: Nov. 12, 2001

(65) Prior Publication Data

US 2003/0090247 A1 May 15, 2003

(51) Int. Cl.[7] .............................................. G05F 1/577
(52) U.S. Cl. .......................... 323/267; 323/266; 363/89
(58) Field of Search .............................. 363/18, 19, 81, 363/89, 127; 323/267, 266, 288

(56) References Cited

U.S. PATENT DOCUMENTS

| 5,075,839 A | 12/1991 | Fisher et al. ................... 363/48 |
| 5,208,559 A | 5/1993 | Jordan ......................... 332/109 |
| 5,754,036 A * | 5/1998 | Walker ......................... 323/237 |
| 5,986,911 A | 11/1999 | Tang ............................. 363/89 |

OTHER PUBLICATIONS

By H.P. Yee, Ph.D. and Saturu Sawahata "Secondary Side Post Regulator For Diodeless Flyback Converters" Presented at the Applied Power Electronics Conference held on Feb. 15–19, 1998 at the Disneyland Hotel, Anaheim, California p. 1–6 (No month).

* cited by examiner

Primary Examiner—Jessica Han
(74) Attorney, Agent, or Firm—O'Melveny & Myers LLP

(57) ABSTRACT

A multiple output voltage power supply includes a transformer having a primary winding and a plurality of secondary windings. The primary winding is adapted to have an input voltage coupled thereto. A primary side switch is coupled to the primary winding and is adapted to control power applied to the transformer in a power cycle responsive to a peak current mode control signal. A plurality of output circuits are coupled to respective ones of the plurality of secondary windings and provide respective output voltages. The plurality of output circuits each further includes a forward rectifier adapted to rectify power during a positive portion of the power cycle and a free-wheeling rectifier adapted to rectify power during a negative portion of the power cycle. One of the plurality of output circuits further includes a bypass switch adapted to interrupt operation of the respective forward rectifier. A secondary side post regulation circuit controls operation of the bypass switch. The post regulation circuit further includes a signal generator adapted to receive a synchronization signal corresponding to the power cycle. The signal generator generates a sawtooth waveform that rises during a positive portion of the synchronization signal and falls during a zero portion of the synchronization signal. A Schmidt trigger coupled to the signal generator has an enabled state when a leading edge of the sawtooth waveform reaches a threshold level and a disabled state when the synchronization signal falls to zero. A driver coupled to the Schmidt trigger generates a drive signal used to control the bypass switch in accordance with the enabled and disabled states of the Schmidt trigger.

17 Claims, 5 Drawing Sheets

LEADING EDGE MODULATOR FOR POST REGULATION OF MULTIPLE OUTPUT VOLTAGE POWER SUPPLIES

BACKGROUND OF THE INVENTION

1. Field of the Invention

The present invention pertains to the regulation of power supplies with multiple outputs. In particular, this invention relates to a leading-edge modulation technique used for secondary-side post-regulation (SSPR) of power supplies with multiple outputs.

2. Description of Related Art

In response to the increasing complexity of many electronic devices, there has been an increasing demand for power supplies that provide two or more isolated and tightly regulated voltages. Most microprocessors, for example, require a precisely controlled supply voltage of 3.3V or lower as well as the standard supply of 5V. A recent trend towards smaller-sized electronic products has, however, introduced several design issues regarding the power density and efficiency of such power supplies. In order to address these issues, design engineers have a limited number of regulation techniques at their disposal. Some of the most popular techniques include the use of linear regulators, coupled inductors, post DC/DC (direct current/direct current) converters, magnetic amplifiers, and secondary-side post-regulators (SSPRs). Although each of these techniques has its own advantages and disadvantages, the high efficiency, low cost, and simple implementation of the SSPR technique has rapidly made it the most popular choice for high-frequency, high-power density DC/DC converters.

An SSPR uses a semiconductor device as a switch. This device is connected in series with the power converter's secondary winding and performs either a delayed turn-on function (leading-edge modulation) or a delayed turn-off function (trailing-edge modulation). The transfer functions for both modes are the same except for a negative sign in front of the transfer function for the leading-edge modulation, because the greater the required duty cycle, the earlier the power switch must turn on. Although similar, these modes each possess unique functional characteristics. In particular, while leading-edge modulation is compatible with any pulse width modulator topology and any control method, trailing-edge modulation creates current waveforms on the primary side with a negative step. This negative step characteristic makes trailing-edge modulation incompatible with peak-current-mode control, which is by far the most popular mode of operation.

Although leading-edge modulation is well known in the art, its implementation is often complicated and usually consists of many components. Accordingly, this invention satisfies the need for a simplified leading-edge modulator for use in secondary-side post-regulation.

SUMMARY OF THE INVENTION

The present invention is directed to a simplified leading-edge modulator for use in secondary-side post-regulation of multiple output voltage power supplies.

In an embodiment of the invention, a multiple output voltage power supply comprises a transformer having a primary winding and a plurality of secondary windings. The primary winding is adapted to have an input voltage coupled thereto. A primary side switch is coupled to the primary winding and is adapted to control power applied to the transformer in a power cycle responsive to a peak current mode control signal. A plurality of output circuits are coupled to respective ones of the plurality of secondary windings and provide respective output voltages. The plurality of output circuits each further comprise a forward rectifier adapted to rectify power during a positive portion of the power cycle and a free-wheeling rectifier adapted to rectify power during a negative portion of the power cycle. One of the plurality of output circuits further comprises a bypass switch adapted to interrupt operation of the respective forward rectifier. A secondary side post regulation circuit controls operation of the bypass switch. The post regulation circuit further comprises a signal generator adapted to receive a synchronization signal corresponding to the power cycle. The signal generator generates a sawtooth waveform that rises during a positive portion of the synchronization signal and falls during a zero portion of the synchronization signal. A Schmidt trigger coupled to the signal generator has an enabled state when a leading edge of the sawtooth waveform reaches a threshold level and a disabled state when the synchronization signal falls to zero. A driver coupled to the Schmidt trigger generates a drive signal used to control the bypass switch in accordance with the enabled and disabled states of the Schmidt trigger.

A more complete understanding of the leading edge modulator will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a simplified leading edge modulator circuit. In the detailed description that follows, like element numerals are used to describe like elements illustrated in one or more of the figures.

Figure 1:
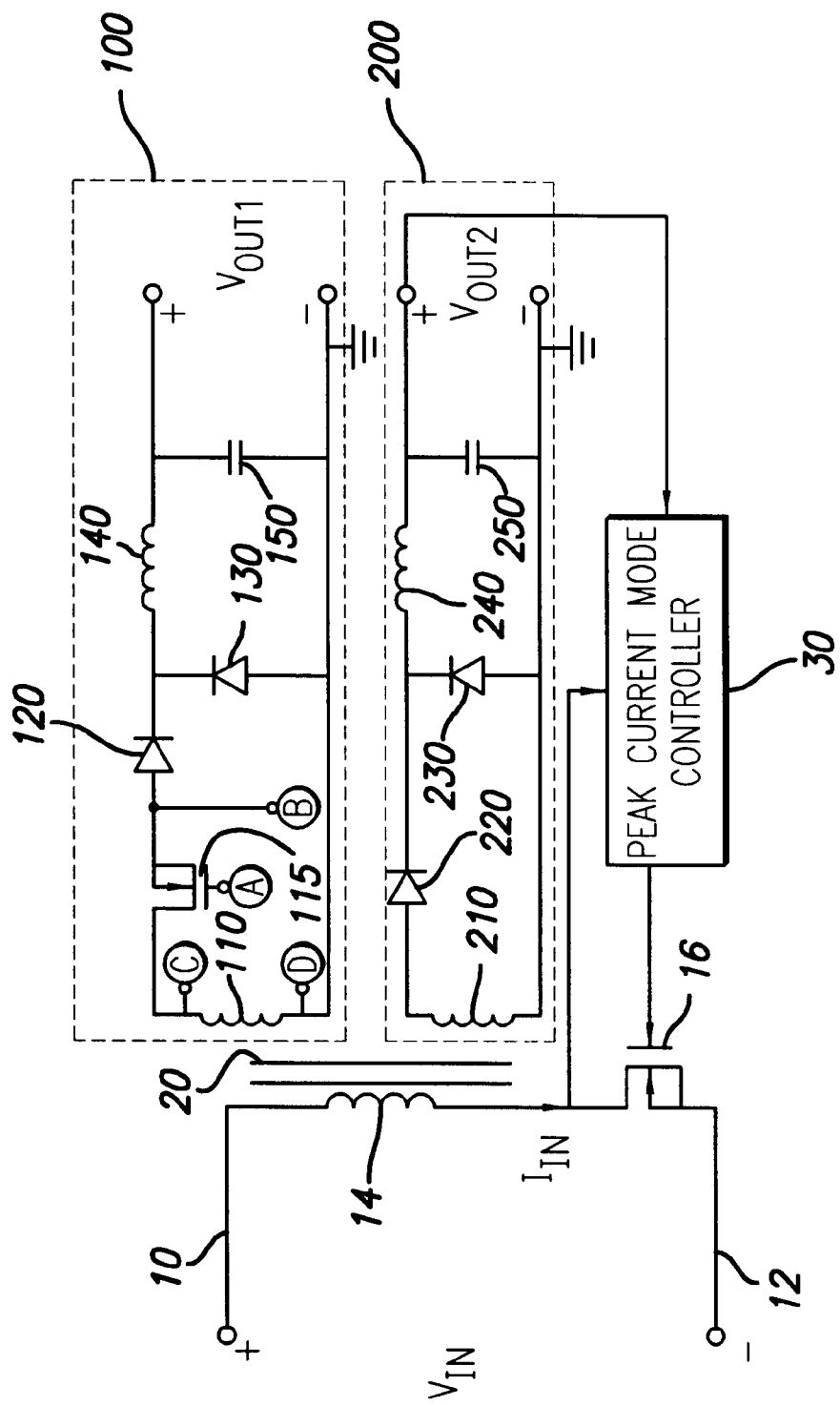
FIG. 1 is a schematic diagram of a multiple output DC/DC power converter.

In FIG. 1, a schematic diagram of a multiple output DC/DC power converter is shown. The internal circuitry of this converter includes a transformer 20 having a primary and a secondary side, and a peak current mode controller 30. An input voltage $V_{IN}$ is applied on the primary side of the converter between a positive input terminal 10 and a negative input terminal 12. A first end of a primary winding 14 of transformer 20 is connected to the positive input terminal 10 and a first switch 16 is coupled between a second end of the primary winding and the negative input terminal 12. The first switch 16 may be provided by a MOSFET having its source terminal connected to a second end of primary winding 14, its drain terminal connected to the negative terminal 12 of input voltage $V_{IN}$, and its gate terminal connected to the output of the peak current mode controller 30.

On the secondary side of the transformer 20, first and second output circuits 100, 200 respectively provide first and second DC output voltages $V_{OUT1}$ and $V_{OUT2}$. Output circuit 100 is further comprised of a secondary winding 110, a bypass switch 115, diodes 120 and 130, an inductor 140, and a capacitor 150. A first end C of the secondary winding 110 is connected to a positive output terminal of the output circuit 100 through diode 120 and inductor 140. A second end D of the secondary winding 110 is connected to a negative output terminal of the output circuit 100 and to ground. The diode 130 extends in parallel with the secondary winding 110. The bypass switch 115 is disposed in series between the first end C of the secondary winding 110 and the diode 120. The bypass switch 115 may be provided by a MOSFET device, having its source terminal connected to the first end C of secondary winding 110, its drain connected at point B to the anode of diode 120, and its gate connected at point A to an SSPR circuit (described below with respect to FIGS. 3–5). The capacitor 150 extends across the positive and negative output terminals of the output circuit 100, and the output voltage $V_{OUT1}$ is taken between the positive and negative output terminals.

Similarly, output circuit 200 is further comprised of a secondary winding 210, diodes 220 and 230, an inductor 240, and a capacitor 250. Output circuit 200 is constructed in like manner as output circuit 100, except that it does not include a bypass switch. The output voltage ($V_{OUT2}$) is taken between the positive and negative output terminals of the output circuit 200.

The primary side switch 16 is turned on and off with a duty cycle determined by the peak current mode controller 30 to produce a series of rectangular pulses that alternate between a positive voltage and a negative voltage. This results in a voltage waveform ($V_{CD}$) present across the secondary winding 110 (see FIG. 5) known as a "non-optimal reset" secondary voltage in which the voltage remains at the zero level during a portion of one switching cycle. With the bypass switch 115 in a conductive state, when the voltage across the secondary winding 110 is positive, i.e., the voltage at end C is positive with respect to the voltage at end D, a current path is formed through the diode 120, the secondary winding 110, and the inductor 140 to deliver power to the output terminals. Conversely, when the voltage across the secondary winding is negative, i.e., the voltage at end C is negative with respect to the voltage at end D, a path for magnetization current stored in the inductor 140 during the previous part of the cycle is formed through the diode 130 and the inductor 140 to continue delivering power to the output terminals. The capacitor 150 remains charged to smooth the output voltage ($V_{OUT1}$). It should be appreciated that output circuit 200 operates in a similar manner.

Power is delivered to the secondary side of the transformer 20 only during the positive part of the cycle. The negative part of the cycle is used to reset the transformer 20. The diode 120 is generally known as a "forward" rectifier since it is used to conduct current to the output terminals during the positive part of the power cycle. The diode 130 is generally known as a "free-wheeling" rectifier since it is used to conduct current to the output terminals during the negative part of the cycle when the transformer 20 is resetting. The peak current mode controller 30 senses the output voltage ($V_{OUT2}$) from the output circuit 200 and the current ($I_{IN}$) through the primary side of the transformer 20, and uses these inputs to control the duty cycle for the primary side switch 16. This provides the converter circuit with over-current protection and cycle-by-cycle current limits. It should be appreciated that the forward and free-wheeling rectifiers may be provided by diodes as illustrated in FIG. 1, or alternatively may be provided by field effect transistors operating as synchronous rectifiers, and the like.

The secondary side switch 115 functions to delay the flow of current from the secondary winding 110 during the positive part of the cycle. When the switch 115 is on, current flows in the manner discussed above. When the switch 115 is off, current flow from the secondary winding 110 is interrupted. By controlling the operation of the switch 115, the power delivered to the output terminals ($V_{OUT1}$) can be regulated. As will be further described below, a drive signal ($V_{AB}$) measured between terminals A and B (see FIG. 1) controls the operation of the switch 115.

Figure 2A:
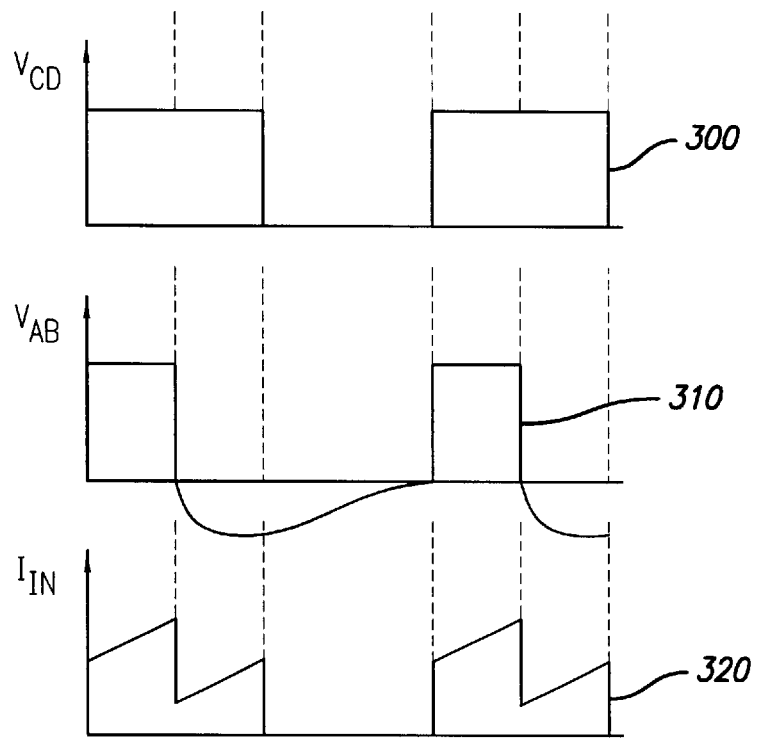
FIG. 2A is a timing diagram illustrating the SSPR drive signals and primary side current waveform resulting from trailing-edge modulation.
Figure 2B:
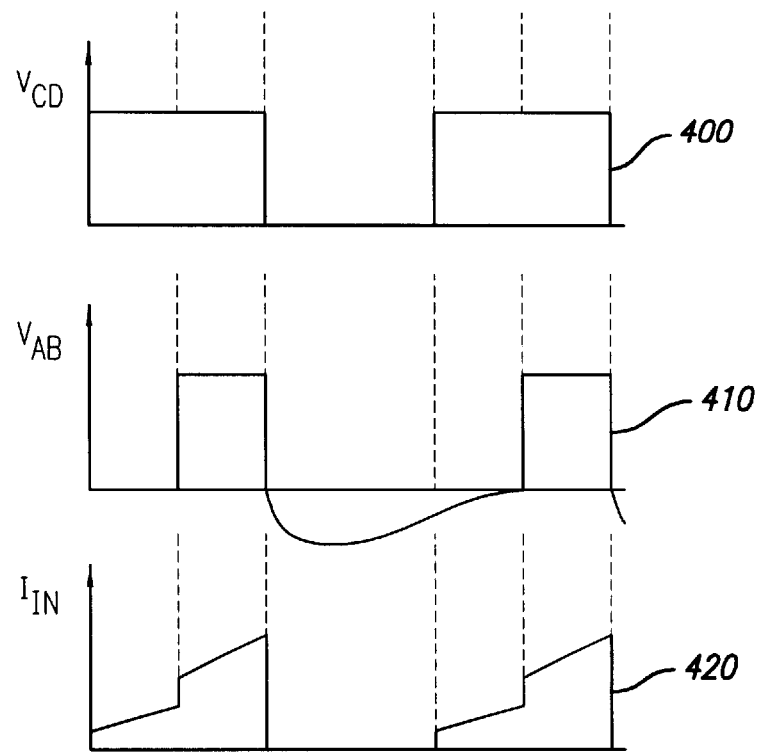
FIG. 2B is a timing diagram illustrating the SSPR drive signals and primary side current waveform resulting from leading-edge modulation.

Timing diagrams illustrating the SSPR drive signals and the primary side current waveform $I_{IN}$ resulting from both trailing-edge and leading-edge modulation are respectively shown in FIGS. 2A and 2B. With trailing-edge modulation (FIG. 2A), the drive signal ($V_{AB}$) applied to the secondary side switch 115 (i.e., waveform 310) goes positive at the same time as the voltage waveform ($V_{CD}$) present across the secondary winding 110 (i.e., waveform 300). The drive signal ($V_{AB}$) then drops to zero (or slightly negative) before the end of the positive portion of the voltage waveform ($V_{CD}$). Therefore, the secondary side switch 115 turns on at the start of the positive portion of the power cycle, and turns off before the end of the positive portion of the power cycle, thereby providing regulation at the trailing-edge of the power cycle. With leading-edge modulation (FIG. 2B), the drive signal ($V_{AB}$) applied to the secondary side switch 115 (i.e., waveform 410) goes positive while the voltage waveform ($V_{CD}$) present across the secondary winding 110 (i.e., waveform 400) remains at zero (or slightly negative). The drive signal ($V_{AB}$) then goes positive before the end of the positive portion of the voltage waveform ($V_{CD}$). Therefore, the secondary side switch 115 remains off at the start of the positive portion of the power cycle, and turns on before the end of the positive portion of the power cycle, thereby providing regulation at the leading-edge of the power cycle. In both modulation schemes, the primary side current waveform 320, 420 increases when the drive signal ($V_{AB}$) (i.e., waveforms 310, 410) are positive.

Since most conventional power converters use switches with fast turn-on characteristics (such as an n-channel MOSFET as illustrated in FIG. 1), the switch 115 turns on before any measurable change of current can take place in the secondary winding 110. This nearly loss-less turn-on characteristic is the same for both trailing-edge modulation and leading-edge modulation. The negative step current waveform 320 resulting from trailing-edge modulation, however, makes this method incompatible with peak current mode (PCM) control. Therefore, a simplified leading-edge modulation scheme as described in this invention is desired in the art.

Figure 3:
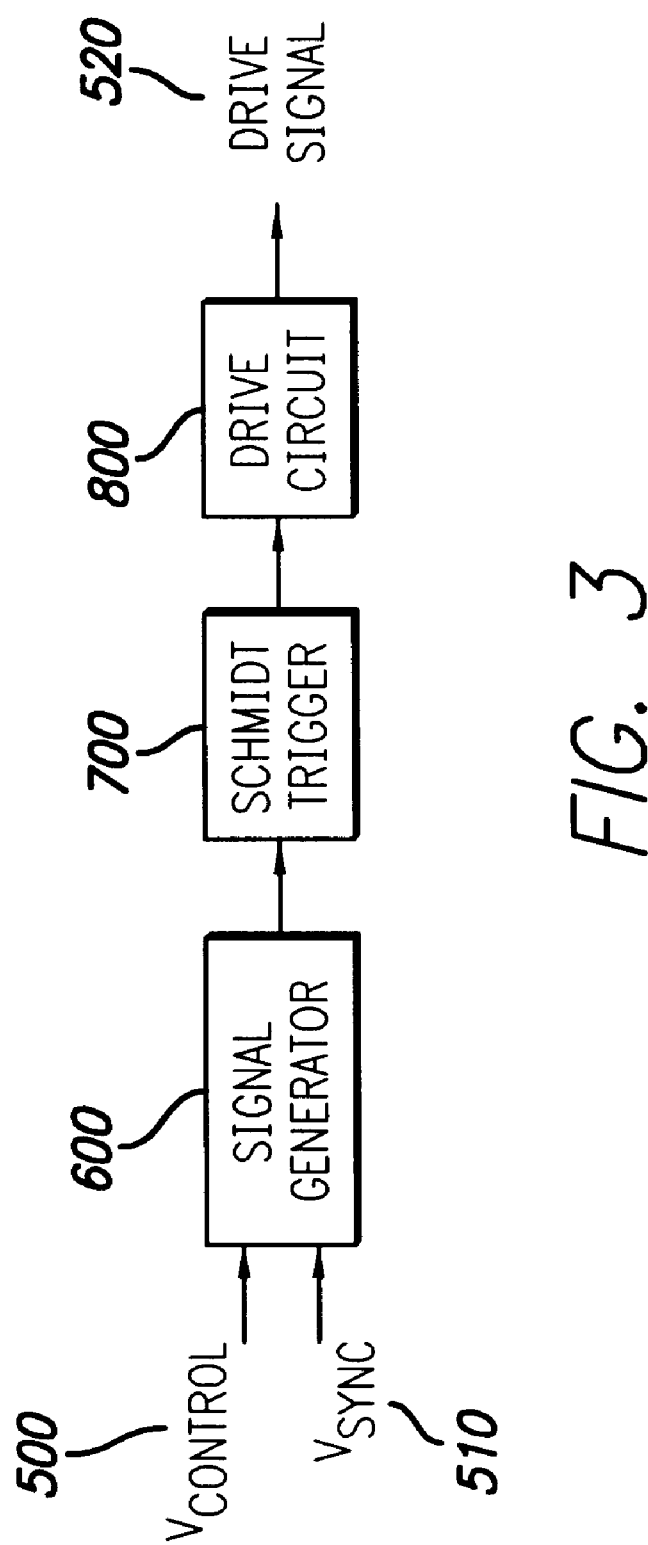
FIG. 3 is block diagram illustrating an SSPR circuit according to a preferred embodiment of the invention.

A block diagram illustrating an SSPR circuit according to a preferred embodiment of the invention is shown in FIG. 3. As shown, this circuit is comprised of a signal generator 600, a Schmidt trigger 700, and a drive circuit 800. The signal generator 600 connects directly to the Schmidt trigger 700, which directly connects to the drive circuit 800. A control signal ($V_{CONTROL}$) 500 and synchronization signal ($V_{SYNC}$) 510 are both provided as inputs to the signal generator 600.

The control signal ($V_{CONTROL}$) 500 provides a predetermined reference voltage. The synchronization signal ($V_{SYNC}$) 510 is synchronized to the positive portion of the voltage waveform ($V_{CD}$) across secondary winding 110 of transformer 20 (see FIG. 5). The signal generator 600 generates a sawtooth waveform that rises during a positive portion of the synchronization signal ($V_{SYNC}$) 510, and falls during a zero portion of the synchronization signal. The Schmidt trigger 700 receives the sawtooth waveform and the synchronization signal ($V_{SYNC}$) 510, and turns on when the leading edge of the sawtooth waveform reaches a threshold level and turns off when the synchronization signal ($V_{SYNC}$) 510 falls to zero. The drive circuit 800 then generates a drive signal ($V_{AB}$) 520 used to control the bypass switch 115 in which the bypass switch is turned on when the sawtooth waveform reaches the threshold level and turns off simultaneously with trailing edge of the synchronization signal ($V_{SYNC}$) 510. A better comprehension of this dynamic is obtained through the following analysis of the invention's circuit schematic.

Figure 4:
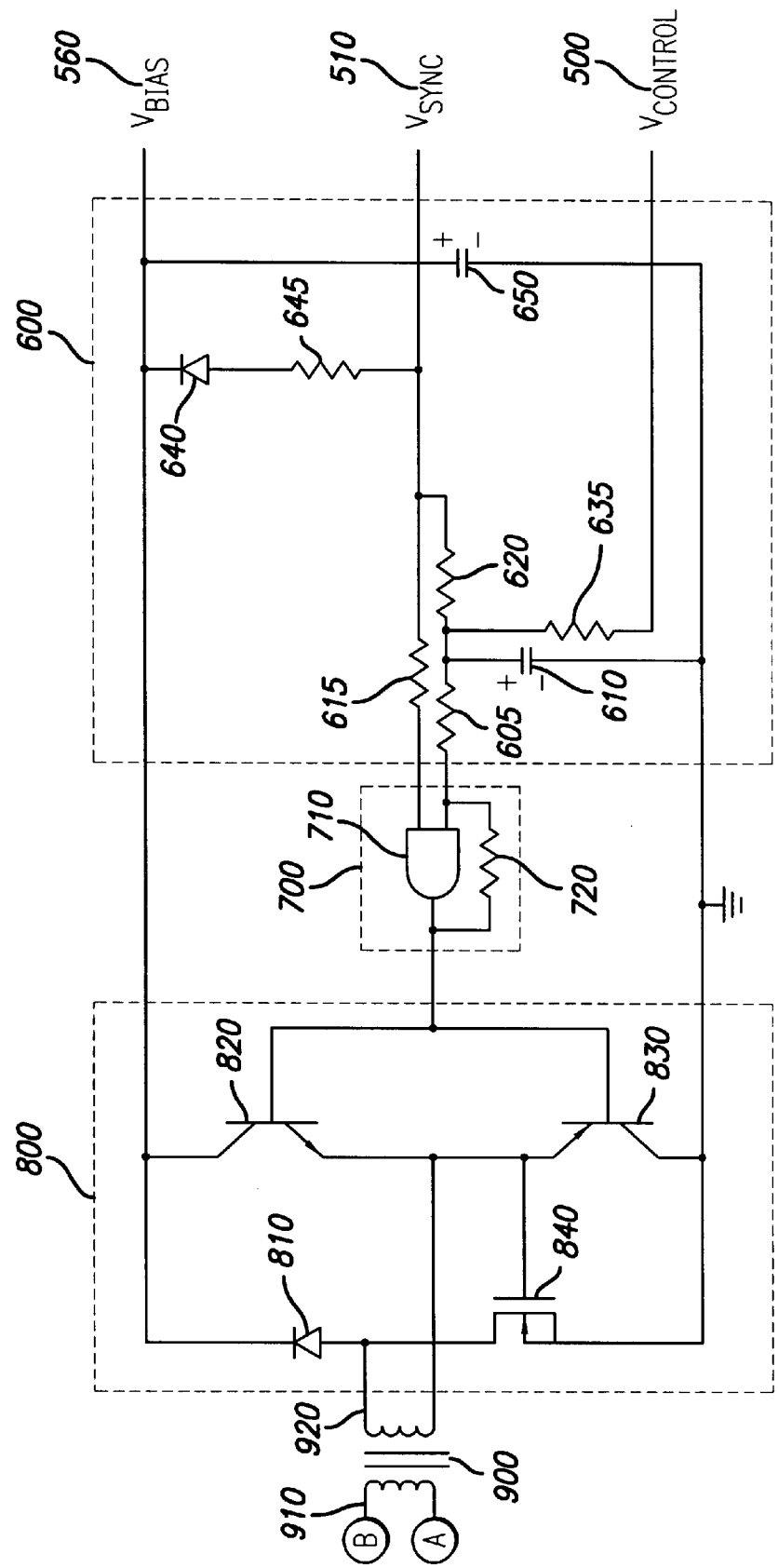
FIG. 4 is a schematic diagram of an SSPR circuit according to an embodiment of the invention.

In FIG. 4, a schematic diagram of an SSPR circuit according to an embodiment of the invention is shown. As illustrated, the SSPR circuit is comprised of a signal generator circuit 600, a Schmidt trigger circuit 700, a drive circuit 800, and a transformer 900 with primary and secondary windings, 920 and 910, respectively. The signal generator circuit 600 is further comprised of capacitors 610 and 650, diode 640, and resistors 605, 615, 620, 635, and 645. The synchronization signal ($V_{SYNC}$) 510 is connected to a junction of resistors 615, 620, and 645. The capacitor 650 is connected between the bias voltage ($V_{BIAS}$) and ground. Resistor 645 and diode 640 are connected between the bias voltage ($V_{BIAS}$) and the synchronization signal ($V_{SYNC}$). The synchronization signal ($V_{SYNC}$) is connected to a first input terminal of the Schmidt trigger circuit 700 through resistor 615, and to a second input terminal of the Schmidt trigger circuit through resistors 605, 620. The resistors 605, 620 provide a voltage divider with the capacitor 610 coupled to ground from the junction between resistors 605, 620. The control signal ($V_{CONTROL}$) 500 is also coupled to the junction between resistors 605, 620 through resistor 635.

The Schmidt trigger circuit 700 is comprised of a two-input logic AND gate 710 and a resistor 720. Resistor 720 provides a feedback path between the output of the AND gate 710 to the input connected to resistor 605. The output of the AND gate 710 also connects directly to the drive circuit 800, which is further comprised of bipolar transistors 820 and 830, a diode 810, and a MOSFET 840. In particular, the output of the Schmidt trigger 700 is connected to each of the base terminals of transistors 820 and 830. The emitter terminals of transistors 820, 830 are commonly coupled together, to the gate terminal of MOSFET 840, and to a second end of primary winding 920. The collector terminal of transistor 820 is connected to the bias voltage ($V_{BIAS}$). The collector terminal of transistor 830 is connected to ground. The diode 810 is connected between a first end of primary winding 920 and the bias voltage ($V_{BIAS}$). The source terminal of MOSFET 840 is connected to ground, and the drain terminal of the MOSFET is connected to the second end of the primary winding 920. The output of this drive circuit 800 is then passed to secondary winding 910 via primary winding 920 of transformer 900.

The control signal ($V_{CONTROL}$) 500 and synchronization signal ($V_{SYNC}$) 510 are both applied as inputs to the signal generator circuit 600. In particular, the synchronization signal ($V_{SYNC}$) 510 is provided as a first input to the AND gate 710 via resistor 615. When the synchronization signal ($V_{SYNC}$) 510 transitions to a positive voltage level, the capacitor 610 is charged with current through resistor 620. The voltage ($V_{CAP}$) across the capacitor 610 provides a second input of AND gate 710 via resistor 605. When the voltage across the capacitor 61 reaches a threshold level ($V_{TH}$), the AND gate 710 changes state from low to high logic output. A high logic output of the AND gate 710 causes transistor 820 to conduct and transistor 830 to shut off. This causes the A side of the secondary winding 920 to be connected to the bias voltage ($V_{BIAS}$), and causes MOSFET 840 to conduct and connect the B side of the secondary winding to ground, producing a positive drive signal ($V_{AB}$). When the synchronization signal ($V_{SYNC}$) 510 transitions to a zero voltage level, the capacitor 610 discharges through the resistor 620. Also, the transition of the synchronization signal ($V_{SYNC}$) causes the first input to the AND gate 710 to go low, further causing the output of the AND gate to transition to a low logic output. This causes transistors 820, 830 to change state, thereby connecting the A side of the secondary winding 920 to ground. As discussed above with respect to FIG. 1, a positive regulation voltage ($V_{AB}$) causes bypass switch 115 to conduct, and a negative voltage drive signal ($V_{AB}$) causes bypass switch 115 to shut off.

Figure 5:
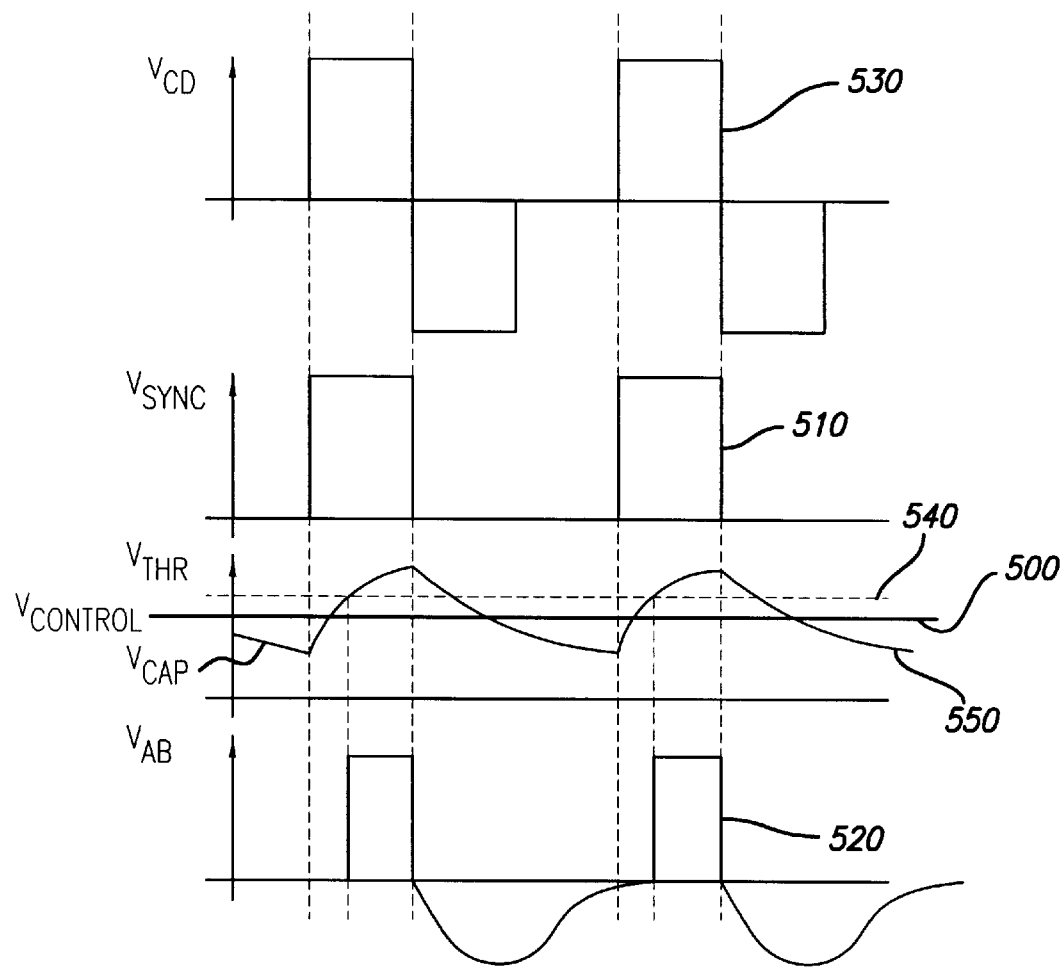
FIG. 5 is a timing diagram illustrating waveforms through various components of the SSPR circuit described in FIG. 4.

In FIG. 5, a timing diagram illustrating waveforms through various components of the SSPR circuit is shown. As illustrated, a synchronization signal ($V_{SYNC}$) 510 is synchronized with respect to the positive voltage waveform ($V_{CD}$) 530 of secondary winding 110. This synchronization signal ($V_{SYNC}$) 510 is then used to control the charge and discharge of capacitor 610. Charge begins to accumulate in the capacitor 610 when the synchronization signal ($V_{SYNC}$) 510 turns on, causing the capacitor ($V_{CAP}$) to rise. When the magnitude of the capacitor voltage ($V_{CAP}$) 550 exceeds the threshold voltage ($V_{THR}$) 540 of the AND gate 710, the input is interpreted as a logic high signal; otherwise, it is interpreted as a logic low signal. As a result, the output of the AND gate 710 is high when both the synchronization signal ($V_{SYNC}$) 510 is on and the capacitor voltage ($V_{CAP}$) 550 exceeds the AND gate threshold voltage ($V_{THR}$) 540. The resulting drive signal ($V_{AB}$) 520 has a leading edge that is delayed with respect to the synchronization signal ($V_{SYNC}$) and a trailing edge that is simultaneous with the synchronization signal.

The leading edge of this drive signal ($V_{AB}$) 520 can be modulated by varying the voltage of the control signal ($V_{CONTROL}$) 500 to cause the capacitor 610 to charge more quickly or slowly. By increasing the voltage of the control signal ($V_{CONTROL}$) 500, charge on the capacitor 610 accumulates faster causing the capacitor voltage ($V_{CAP}$) 550 to thereby reach the AND gate threshold voltage ($V_{THR}$) 540 faster. As a result, the leading edge of the drive signal ($V_{AB}$) 520 is triggered sooner than with the lower control voltage ($V_{CONTROL}$) 500. Conversely, if the control voltage ($V_{CONTROL}$) 500 is lowered, the charge on the capacitor 610 would accumulate at a slower rate causing its voltage ($V_{CAP}$) 550 to reach the threshold voltage ($V_{THR}$) 540 at a slower rate as well. In this case, the leading edge of the drive signal ($V_{AB}$) 520 is triggered later than with the higher control voltage ($V_{CONTROL}$) 500.

By turning on the bypass switch 115 delayed with respect to the secondary winding voltage ($V_{CD}$), there is less current stress on the primary side switch 16 at the time it is turned on. This results in less switching current losses during turn on of primary side switch 16. At the time of turn off of the bypass switch 115, the current in the bypass switch has already reached zero, resulting in zero turn off switching losses.

Having thus described a preferred embodiment of the leading edge modulator, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A secondary-side post-regulation (SSPR) circuit for a multiple output voltage power supply comprising a plurality of output circuits with at least one output circuit including a current bypass switch, the SSPR circuit comprising:

a signal generator adapted to receive a synchronization signal corresponding to a power cycle applied to said at least one output circuit, said signal generator generating a sawtooth waveform that rises during a positive portion of the synchronization signal and falls during a zero portion of the synchronization signal;

a Schmidt trigger having an enabled state when a leading edge of said sawtooth waveform reaches a threshold level and a disabled state when said synchronization signal falls to zero; and a driver generating a drive signal used to control said bypass switch in accordance with said enabled and disabled states of said Schmidt trigger.

2. The SSPR circuit of claim 1, wherein said signal generator circuit further comprises a capacitor that charges during said positive portion of said synchronization signal and discharges during said zero portion of said synchronization signal.

3. The SSPR circuit of claim 2, wherein said Schmidt trigger further comprises a first input terminal coupled to said capacitor.

4. The SSPR circuit of claim 3, wherein said Schmidt trigger further comprises a second input terminal coupled to synchronization signal.

5. The SSPR circuit of claim 1, wherein said driver further comprises a bipolar pair of transistors having commonly coupled gate terminals and emitter terminals.

6. The SSPR circuit of claim 1, further comprising a transformer coupled between said driver and said bypass switch.

7. The SSPR circuit of claim 1, wherein said signal generator is responsive to a control signal to vary a rise time of said sawtooth waveform.

8. A multiple output voltage power supply comprising:

a transformer having a primary winding and a plurality of secondary windings, said primary winding adapted to have an input voltage coupled thereto;

a primary side switch coupled to said primary winding and adapted to control power applied to said transformer in accordance with a desired power cycle;

a plurality of output circuits coupled to respective ones of said plurality of secondary windings and providing respective output voltages, said plurality of output circuits each further comprising a forward rectifier adapted to rectify said power during a positive portion of said power cycle and a free-wheeling rectifier adapted to rectify said power during a negative portion of said power cycle, at least one of said plurality of output circuits further comprising a bypass switch adapted to interrupt operation of said forward rectifier; and a post regulation circuit controlling operation of said bypass switch, said post regulation circuit further comprising:

a signal generator adapted to receive a synchronization signal corresponding to said power cycle, said signal generator generating a sawtooth waveform that rises during a positive portion of the synchronization signal and falls during a zero portion of the synchronization signal;

a Schmidt trigger having an enabled state when a leading edge of said sawtooth waveform reaches a threshold level and a disabled state when said synchronization signal falls to zero; and a driver generating a drive signal used to control said bypass switch in accordance with said enabled and disabled states of said Schmidt trigger.

9. The multiple output voltage power supply of claim 8, wherein said signal generator circuit further comprises a capacitor that charges during said positive portion of said synchronization signal and discharges during said zero portion of said synchronization signal.

10. The multiple output voltage power supply of claim 9, wherein said Schmidt trigger further comprises a first input terminal coupled to said capacitor.

11. The multiple output voltage power supply of claim 9, wherein said Schmidt trigger further comprises a second input terminal coupled to synchronization signal.

12. The multiple output voltage power supply of claim 8, wherein said driver further comprises a bipolar pair of transistors having commonly coupled gate terminals and emitter terminals.

13. The multiple output voltage power supply of claim 8, further comprising a transformer coupled between said driver and said bypass switch.

14. The multiple output voltage power supply of claim 8, wherein said signal generator is responsive to a control signal to vary a rise time of said sawtooth waveform.

15. A method for regulating a multiple output voltage power supply comprising a plurality of output circuits with at least one output circuit including a current bypass switch, the method comprising the steps of:

receiving a synchronization signal corresponding to a power cycle applied to said at least one output circuit;

generating a sawtooth waveform that rises during a positive portion of the synchronization signal and falls during a zero portion of the synchronization signal;

generating an enabling signal that begins when a leading edge of said sawtooth waveform reaches a threshold level and ends when said synchronization signal falls to zero; and controlling said bypass switch in accordance with said enabling signal.

16. The method of claim 15, wherein said generating step further comprises charging a capacitor during said positive portion of said synchronization signal and discharging said capacitor during said zero portion of said synchronization signal.

17. The method of claim 15, wherein said generating step further comprises varying a rise time of said sawtooth waveform.

* * * * *